Aug. 12, 1947.   L. E. NORTON   2,425,387
DIRECTION FINDER
Filed May 29, 1943
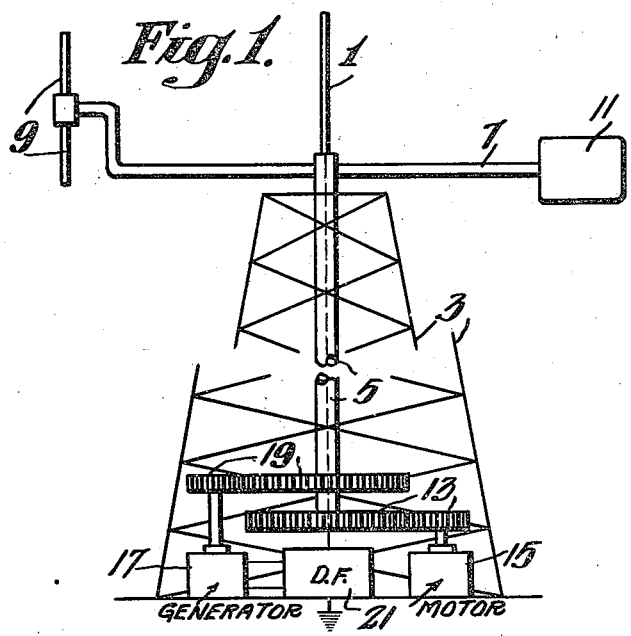
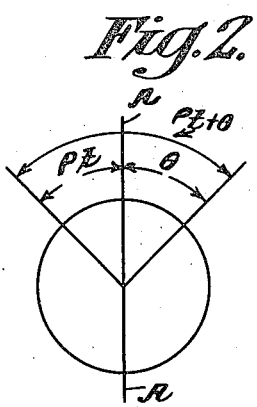
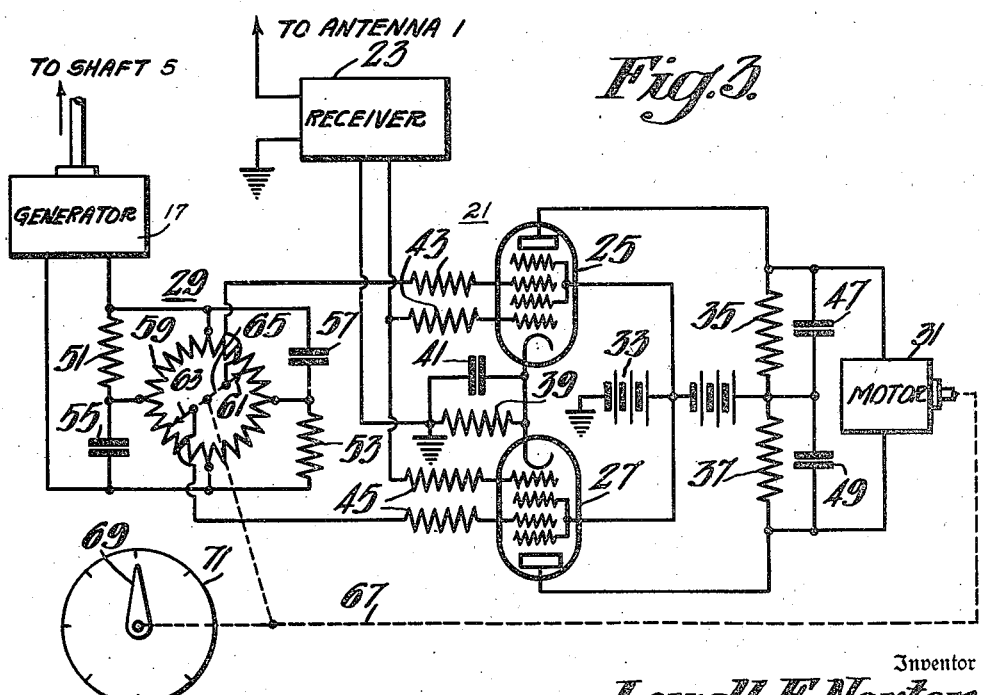
Inventor
Lowell E. Norton
By
Attorney Patented Aug. 12, 1947

2,425,387

UNITED STATES PATENT OFFICE 2,425,387

DIRECTION FINDER

Lowell E. Norton, Princeton, N. J., assignor to Radio Corporation of America, a corporation of Delaware Application May 29, 1943, Serial No. 489,035

4 Claims. (Cl. 250—11)

This invention relates to radio direction finders, and more particularly to improvements in the art of determining the azimuth of arrival of a radio wave by means of a continuously revolving antenna element.

According to the present invention, it is proposed to employ a stationary non-directive wave collector and to cyclically vary the response thereof by revolving about said wave collector an auxiliary resonant antenna element which modifies the field produced at the collector by an arriving wave. As described more fully hereinafter, revolution of the tuned element about the collector produces phase modulation of the signal picked up by the collector.

Conventional direction finders employing directional antenna arrays comprising spaced interconnected collector elements are subject to errors caused by unfavorable wave polarization and steep incidence of wave arrival. This has been avoided to some extent as, for example, in the shielded U Adcock type arrangement, by careful design and accurate construction to avoid response to field components polarized in any manner other than that to which the collector elements are intended to respond. The vertical rod elements of the Adcock each respond individually only to vertical electric field components. However, it is found in practice that a pair of interconnected vertical rods will respond also to horizontal electric field components to an extent sufficient to cause serious errors in bearing indication when the field produced by the arriving wave includes a large horizontal electric component. The reasons for this effect are not completely understood but appear to involve secondary pickup in the horizontal connections, and perhaps proximity effects caused by mutual coupling between the spaced collector elements.

The principal object of this invention is to provide an improved method of and means for radio direction finding in which deleterious effects are avoided by omission of all horizontal conductive surfaces.

Another object is to provide an improved method of and means for determining the direction of wave arrival, using phase modulation of the received signal produced by revolution of a receiving antenna element.

These and other objects will become apparent to those skilled in the art upon consideration of the following description with reference to the accompanying drawings, of which:

Figure 1 is a schematic elevational view of a direction finder constructed according to the present invention, Figure 2 is a graph showing certain angular relationships involved in the operation of the system, and Figure 3 is a schematic circuit diagram of an indicator system according to the invention.

Referring to Fig. 1, an untuned vertical rod antenna 1 is supported at the upper end of a tower 3. A vertical shaft 5 extends through the tower 3 and supports at its upper end a horizontal boom 7, supporting a vertical dipole 9 at one end and provided at the other end with a counterweight 11. The dipole 9 is resonant and may be varied in tuning by means of a mechanical linkage, not shown, such as ropes or shafts and gearing connections. Vertical magnetic dipoles may also be used instead of the vertical electric dipoles. The tower 3, shaft 5 and boom 7 are all constructed preferably of non-conductive material such as wood. The lower end of the shaft 5 is connected through gearing 13 to a motor 15. The motor 15 is connected to a source of power such as power lines, not shown. An alternator 17 is connected to the shaft 5 through gearing 19 to provide one cycle for each revolution of the shaft 5. The indicator equipment, generally designated by the numeral 21, is connected to the antenna 1 and to the generator 17.

Referring to Fig. 3, the indicator equipment 21 includes a radio receiver 23 connected to a phase responsive servo system comprising electron tubes 25, 27, a phase shifter 29 and a reversible D.-C. motor 31. The tubes 25 and 27 are of the multi-grid type, with inner and outer control grids. The inner control grids are connected in parallel to the output of the receiver 23 and the outer control grids are connected in push-pull to the output of the 360 degree phase shifter 29. A D.-C. source 33 is connected through load resistors 35 and 37 to the anodes of the tubes 25 and 27, respectively. A self-bias resistor 39, shunted by a capacitor 41, is connected to the anodes of the tubes 25 and 27. The screen grids of the tubes 25 and 27 are connected to a point of intermediate potential on the source 33. Current limiting resistors 43 and 45 are included in series with the control grids of the tubes 25 and 27. The load resistors 35 and 37 are by-passed by capacitors 47 and 49.

The phase shifter 29 includes resistors 51 and 53 and capacitors 55 and 57 connected in a bridge network, and a double voltage divider 59 connected at four equally spaced points to conjugate terminals of the bridge. The resistor 59 is provided with two variable contacts 61 and 63 mechanically connected together, as indicated by the dash line 65. The contacts 61 and 63 are connected to the shaft of the motor 31 as schematically indicated by the dash line 67, and to a pointer 69. A scale 71, calibrated in terms of azimuth is provided for cooperation with the pointer 69.

The operation of the above described system is as follows:

The motor 15 rotates the shaft 5 at a constant angular velocity, revolving the antenna 9 in a circular path about the antenna 1. The antenna 9 is tuned near, but not necessarily exactly to, resonance at the frequency at which the system is to operate. The voltage induced in the antenna 9 by a radiation field may be represented as:

$$e = E \sin\left[\omega t - \frac{2\pi r}{\lambda} \cos \psi \cos(\rho t + \theta)\right]$$

where $E$ is the amplitude of the voltage $e$, $$\frac{\omega}{2\pi}$$

is the frequency of the arriving wave, $r$ is the radius of the circular path through which the antenna 9 is revolved, $\psi$ is the angle of elevation of wave arrival, $$\frac{\rho}{2\pi}$$

is the frequency of the antenna revolution and $\theta$ is the azimuth of wave arrival referred to in line A—A (Fig. 2). The voltage induced in the antenna 1 in the absence of any effect produced by the antenna 9 would be:

$$e_1 = E_1 \sin \omega t$$

However, the revolving antenna 9 will contribute to the voltage in the antenna 1 so that the total voltage in the antenna 1 is $$e_3 = E_3\left(\sin \omega t + k \sin\left[\omega t - \frac{2\pi r}{\lambda} \cos \psi \cos(\rho t + \theta) + \alpha\right]\right)$$

where $k$ is a coefficient depending upon the mutual coupling between the antennas 1 and 9 and $\alpha$ is the sum of a phase delay angle $$\frac{2\pi r}{\lambda}$$

and a phase angle which is determined by the tuning of the antenna 9. For convenience in expression, the angle $$\frac{2\pi r}{\lambda} \cos \psi$$

will be referred to hereinafter as $\phi$.

The voltage $e_3$ is amplified in the receiver 23 and applied to a detector. The detector output includes a voltage $$e_4 = K k E_3 \Big( \cos[-\phi \cos(\rho t + \theta) + \alpha] -$$

$$\cos 2\omega t \cos[-\phi \cos(\rho t + \theta) + \alpha] +$$

$$\sin 2\omega t \cos[-\phi \cos(\rho t + \theta) + \alpha] +$$

$$\frac{1}{k} - \frac{\cos 2\omega t}{2k} - \frac{\cos}{2k} 2[\omega t - \phi \cos(\rho t + \theta) + \alpha]\Big)$$

The detector output also includes other terms in $\sin n\omega t$ and $\cos n\omega t$ where $n$ is an integral number depending upon the type of detector. The output circuit of the detector is by-passed so as to remove all terms of carrier frequency $$\frac{\omega}{2\pi}$$

and higher frequency. The only remaining component is $$e_5 = E_5 \cos[-\phi \cos(\rho t + \theta) + \alpha]$$

The above expression may be expanded:

$$e_5 = E_5\{\cos \alpha \cos[\phi \cos(\rho t + \theta)] + \sin \alpha \sin[\phi \cos(\rho t + \theta)]\}$$

This may be further expanded to give:

$$e_5 = E_5\{\cos \alpha J_0(\phi) - 2J_2(\phi) \cos[2(\rho t + \theta)] + 2J_4(\phi) \cos[4(\rho t + \theta)] + \ldots\} + E_5\{\sin \alpha 2J_1(\phi) \cos(\rho t + \theta) + 2J_3(\phi) \cos[3(\rho t + \theta)] + 2J_5(\phi) \cos[5(\rho t + \theta)] \ldots\}$$

where $J_0(\phi), J_1(\phi) \ldots J_n \phi$ are coefficients comprising Bessel functions of the first kind and of orders 1, 2 ... $n$.

The simplest mode of operation to demonstrate is that which occurs when the tuning of the antenna 9 is such as to make $\alpha = 0$. For this case $e_5$ reduces to $$e'_5 = E_5\{J_0(\phi) - 2J_2(\phi) \cos[2(\rho t + \theta)] + 2J_4(\phi) \cos[4(\rho t + \theta)] + \ldots\}$$

For phase comparison as described below, it is essential to reduce the voltage $e'_5$ to only one frequency. This requires that one of the Bessel function coefficients $J_0(\phi), J_2(\phi) \ldots J_n(\phi)$ be large with respect to each of the others. This may be done by making the radius of the revolving antenna system small as compared to a wave length at the highest frequency of operation. Assuming that the largest antenna motion is 20°; i. e., 1/18 of the wave length, $$e'_5(20°) = E_5\{.9696 - .0306 \cos[2(\rho t + \theta)] + .00047 \cos[4(\rho t + \theta)] + \ldots\}$$

the coefficient of $\cos[2(\rho t + \theta)]$ is 65 times the coefficient of $\cos[4(\rho t + \theta)]$ and still greater with respect to any coefficient of $\cos[n(\rho t + \theta)]$ where $n$ is any even integral number. Therefore, $e'_5(20°)$ is approximately equal to $$E_5\{.9696 - .0306 \cos[2(\rho t + \theta)]\}$$

It is therefore possible to compare the phase of this voltage with respect to that of a fixed phase reference voltage of frequency $$\frac{\rho}{\pi}$$

to determine $\theta$ directly.

Although tuning the antenna 9 so as to make $\alpha$ always zero will produce the desired result, the system is not restricted to this critical method of operation. Assuming as above that the radius of revolution of the antenna system is 20° at the highest frequency of operation, the output of the receiver 23 when $\alpha \neq 0$, $$e_5(20°) = E_5 \cos \alpha \{.9696 - .0306 \cos[2(\rho t + \theta)] + .00047 \cos[4(\rho t + \theta)] + \ldots\} E_5 \sin \alpha \{.3446 \cos(\rho t + \theta) - .00358 \cos[3(\rho t + \theta)] + \ldots\}$$

The phase comparison is to be made between the term $E_5 \sin \alpha [.3446 \cos(\rho t + \theta)]$ and a constant phase reference voltage of frequency $$\frac{\rho}{2\pi}$$

The term of frequency $$\frac{\rho}{\pi}$$

has a coefficient of only $$-E_5 \cos \alpha\{.0306 \cos[2\rho t + \theta)]\}$$

Assuming the value of $\alpha$ is such that the absolute value of $\cos \alpha$ equals the absolute value of $\sin \alpha$, the intensity of the $$\frac{\rho}{\pi}$$

term is .0888 of that of the $$\frac{\rho}{2\pi}$$

term. Higher harmonies of the frequency $$\frac{\rho}{2\pi}$$

decrease rapidly in intensity with order and their effects on operation of the circuit may be neglected.

It should be noted that any tuning of the antenna 9 which results in a value of $\alpha$ such that $/\sin \alpha/>/\cos \alpha/$ will cause an improvement in the ratio of intensity of the voltage of frequency $$\frac{\rho}{2\pi}$$

to that of frequency $$\frac{\rho}{\pi}$$

Any harmonics higher than $$\frac{\rho}{\pi}$$

are so low in intensity, as compared to the magnitude of the fundamental, that their exact magnitude are of no importance. Thus the only restriction on the tuning of the antenna 9 is that it should be arranged to track the tuning of the receiver 23 so as to make $\alpha$ such that $/\sin \alpha/>/\cos \alpha/$.

The decrease in intensity of harmonics of $$\frac{\rho}{2\pi}$$

with higher order is even greater if the radius of revolution of the antenna is less than 20°. For example, if the radius is 15° at the highest frequency of operation, the output of the radio receiver 23 will be $e_5(15°) = E_5 \cos \alpha \{.9832 - .0171 \cos [2(\rho t + \theta)] + .000147 \cos [4(\rho t + \theta)] + \ldots\} + E_5 \sin \alpha \{.2578 \cos (\rho t + \theta) - .0015 \cos [3(\rho t + \theta)] + \ldots\}$ In this case, the ratio of intensity of the second harmonic $$\frac{\rho}{\pi}$$

to the fundamental $$\frac{\rho}{2\pi}$$

is .065 and all higher harmonics are lower in intensity. Thus the output voltage from the receiver 23 is substantially $e_6 = E_6 \cos (\rho t + \theta)$ The generator 17 provides an output of a frequency equal to the frequency of revolution of the antenna system. The output of the generator 17 is $e_7 = E_7 \cos (\rho t + A)$ Measuring the angular position $\rho t$ of the antenna from the reference line A—A (Fig. 2), the mechanical connection between the shaft 5 and the generator 17 is made so that $A = 0$.

The output voltage $e_7$ of the generator 17 and the output $e_6$ of the receiver 23 are applied to the phase responsive servo system. The two input voltages are of equal frequency $$\frac{\rho}{2\pi}$$

The input from the receiver 23 leads the input from the generator 17 by the angle $\theta$. Assume that the phase shifter 29 is adjusted to introduce a lead of any magnitude B in the voltage $e_7$. The inputs to the outer control grids of the tubes 25 and 27 will then differ in phase from the inputs to the inner control grids by angles of $B - \theta$ and $\theta + \pi - B$, respectively. The control grids are normally biased by means of the common cathode resistor 39 to substantially cut off the plate current. During the time that both inner and outer control grids are positive, the tubes will conduct. Depending upon which is greater, $B - \theta$ or $\theta + \pi - B$, one of the tubes 25 and 27 will conduct more of the time than the other. The pulsating plate currents are integrated by the capacitors 47 and 49. Thus the average current and hence the voltage drop in one of the resistors 35 and 37 will be greater than that in the other, and the resultant voltage applied to the motor 31 will correspond in magnitude and polarity to the difference between $B - \theta$ and $\theta + \pi - B$.

The motor 31 operates to drive the phase shifter 29 to such a position that $B - \theta = \theta + \pi - B$, or $$B = \theta + \frac{\pi}{2}$$

whereupon the voltages across the load resistors 37 and 35 are equal and the resultant voltage applied to the motor 31 is zero. At this time, the position of the control shaft of the phase shifter 29 corresponds to the angle $$\theta + \frac{\pi}{2}$$

The pointer 69 is set at an angle of $$\frac{\pi}{2}$$

with respect to the voltage divider 59 so as to indicate on the scale 71 the angle $\theta$.

Thus the invention has been described as an improved direction finder system incorporating a stationary wave collector element and a tuned antenna revoluble about said element to phase modulate the signals picked up by the collector. Providing certain readily attainable requirements are met with respect to the tuning of the revolving antenna and the radius of the path of revolution, the output of a receiver connected to the system comprises a voltage having a frequency equal to the frequency of antenna revolution and an absolute phase, with respect to a constant reference phase, equal to the azimuth of wave arrival. A constant phase reference voltage is generated by means of an alternator mechanically coupled to the revolving antenna. Although a phase responsive servo system has been described for the indication of azimuth in response to the outputs of the indicator and the radio receiver, it will be apparent to those skilled in the art that any known phase comparison system may be used to determine azimuth from said voltages.

I claim as my invention:

1. A radio direction finder system comprising a fixed antenna and a substantially resonant antenna, means for revolving said substantially resonant antenna about said fixed antenna as a center, a radio receiver means including a demodulator connected to said fixed antenna, means for locally generating an alternating voltage corresponding in instantaneous magnitude to the angular position of said revoluble antenna with respect to a predetermined reference line, and means for comparing the phase of said voltage with the phase of the output voltage of said demodulator means.

2. The method of determining the azimuth of arrival of a radio wave comprising the steps of cyclically distorting the field produced by said wave through the locus of a point revolving at a predetermined rate in a closed path about a reference point, receiving the resultant field at said reference point to derive therefrom a modulated carrier, demodulating said carrier to derive a voltage corresponding to the modulation thereof, generating an alternating voltage of constant phase and of a frequency equal to said frequency of revolution and comparing the phases of said generated voltage and said modulation voltage.

3. A radio direction finder system including an untuned antenna and a tunable antenna, means for revolving said tunable antenna about said untuned antenna as a center, means for tuning said tunable antenna to a frequency approximately equal to that of an arriving wave whose azimuth is to be determined, means for locally generating an alternating voltage having an instantaneous magnitude which is a predetermined function of the angular position of said tunable antenna with respect to a predetermined reference line, a radio receiver connected to said untunable antenna and means for comparing the phases of said locally generated voltage and the voltage output of said radio receiver.

4. A radio direction finder system including an untuned antenna and a tunable antenna, means for revolving said tunable antenna about said untuned antenna as a center, means for tuning said tunable antenna to a frequency approximately equal to that of an arriving wave whose azimuth is to be determined, whereby the sum, $\alpha$, of the maximum phase difference between signals derived by said untuned antenna from said wave with opposite positions of said tunable antenna and the phase shift introduced by departure from exact resonance of said tuned antenna is such that sine $\alpha$ is greater in absolute magnitude than cosine $\alpha$, means for locally generating an alternating voltage having an instantaneous magnitude which is a predetermined function of the angular position of said tunable antenna with respect to a predetermined reference line, a radio receiver connected to said untunable antenna and means for comparing the phases of said locally generated voltage and the voltage output of said radio receiver.

LOWELL E. NORTON.